United States Patent
Ooba

(10) Patent No.: US 12,085,919 B2
(45) Date of Patent: Sep. 10, 2024

(54) CONVEYANCE SIMULATION DEVICE AND CONVEYANCE SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 843 days.

(21) Appl. No.: 16/992,273

(22) Filed: Aug. 13, 2020

(65) Prior Publication Data
US 2021/0064009 A1 Mar. 4, 2021

(30) Foreign Application Priority Data
Sep. 2, 2019 (JP) .................... 2019-159898

(51) Int. Cl.
*B25J 9/00* (2006.01)
*B25J 9/16* (2006.01)
*G05B 19/418* (2006.01)

(52) U.S. Cl.
CPC ........ *G05B 19/4182* (2013.01); *B25J 9/0093* (2013.01); *B25J 9/1605* (2013.01); *G05B 2219/31048* (2013.01)

(58) Field of Classification Search
CPC ...... B25J 9/0093; B25J 9/1605; B25J 9/1671; B25J 9/1697; G05B 19/4182; G05B 2219/39102; G05B 2219/39106; G05B 2219/40554; G05B 19/4185; G05B 2219/32357; G05B 19/41885; G05B 19/4189; G05B 2219/39451; G05B 2219/39449; G05B 2219/32014; G05B 2219/31048; B65G 43/08; B65G 47/905; B65G 61/00; B65G 47/02; B65G 47/08; B65G 47/22; B65G 47/74; B65G 47/04; B65B 35/10; G06T 19/006

See application file for complete search history.

(56) References Cited

U.S. PATENT DOCUMENTS

| | | | | |
|---|---|---|---|---|
| 11,635,744 B1* | 4/2023 | Jeanes | ............... | G06F 3/0482 345/473 |
| 2016/0207657 A1* | 7/2016 | Petri | ............... | B65B 35/10 |
| 2018/0111268 A1* | 4/2018 | Atohira | ............... | B25J 9/1671 |
| 2018/0117766 A1 | 5/2018 | Atohira et al. | | |
| 2018/0243905 A1* | 8/2018 | Atohira | ............... | B25J 9/0093 |
| 2019/0018569 A1* | 1/2019 | Andreae | ............... | B65G 43/08 |
| 2019/0202055 A1* | 7/2019 | Wang | ............... | B25J 9/1697 |
| 2019/0344444 A1* | 11/2019 | Morra | ............... | B25J 9/1692 |
| 2022/0088783 A1* | 3/2022 | Shao | ............... | B25J 9/0093 |

FOREIGN PATENT DOCUMENTS

| | | |
|---|---|---|
| JP | 2013-191128 A | 9/2013 |
| JP | 2016-016915 A | 2/2016 |
| JP | 2017-097427 A | 6/2017 |

* cited by examiner

*Primary Examiner* — Khoi H Tran
*Assistant Examiner* — Tanner L Cullen
(74) *Attorney, Agent, or Firm* — Studebaker & Brackett PC

(57) ABSTRACT

The present disclosure is intended to accurately simulate a flow of articles in an environment similar to an actual worksite. A conveyance simulation device includes: a virtual conveyance unit that operates virtually; a first virtual article feeding unit that feeds virtual articles to the virtual conveyance unit under a predetermined condition; and a virtual article management unit that sequentially updates positions of the virtual articles in accordance with a virtual movement of the virtual conveyance unit.

12 Claims, 9 Drawing Sheets

«CONVEYANCE SIMULATION DEVICE AND CONVEYANCE SYSTEM

This application is based on and claims the benefit of priority from Japanese Patent Application No. 2019-159898, filed on 2 Sep. 2019, the content of which is incorporated herein by reference.

BACKGROUND OF THE INVENTION

Field of the Invention

The present invention relates to a conveyance simulation device and a conveyance system.

Related Art

A technique has been known by which sensors, such as a camera and an encoder, are used to detect a position of an article being conveyed by a conveyor, and a robot takes out the article, based on a detection result of the sensors.
Patent Document 1: Japanese Unexamined Patent Application, Publication No. 2016-16915

SUMMARY OF THE INVENTION

Meanwhile, in a system of the above-described type in which a robot is used to take out articles, offline software is used to simulate a flow of the articles detected by sensors, for example.

However, in many cases, a situation at a worksite such as an actual factory is different from an environment reproduced by offline software. For example, a conveyor arranged in an environment reproduced by offline software may be different in width, orientation, etc. from a conveyor installed at an actual worksite. Further, even if the motion of a robot is free from problem in the environment reproduced by the offline software, the actual worksite has many problems such as the presence of an obstacle, which can be noticed only at the actual worksite.

As can be seen, it may be difficult to accurately simulate a flow of articles in an environment similar to the actual worksite, using offline software.

In view of the foregoing background, it has been desired to achieve an accurate simulation of a flow of articles in an environment similar to an actual worksite.

(1) one aspect of the present disclosure is directed to a conveyance simulation device including: a virtual conveyance unit that operates virtually; a first virtual article feeding unit that feeds virtual articles to the virtual conveyance unit under a predetermined condition; and a virtual article management unit that sequentially updates positions of the virtual articles in accordance with a virtual movement of the virtual conveyance unit.

(2) one aspect of the present disclosure is directed to a conveyance system including: a conveyance unit that conveys articles; a movement amount detection unit that detects an amount of movement of the conveyance unit; a second virtual article feeding unit that feeds virtual articles under a predetermined condition; and a virtual article management unit that sequentially updates positions of the virtual articles in accordance with the amount of movement of the conveyance unit.

One aspect of the present disclosure enables an accurate simulation of a flow of articles in an environment similar to an actual worksite.

DETAILED DESCRIPTION OF THE INVENTION

First Embodiment

First, the present embodiment will be schematically described. According to the present embodiment, a conveyance simulation device includes: a virtual conveyance unit that is arranged in a virtual space based on a plan of a design stage of an actual worksite; a virtual article feeding unit that feeds virtual articles to the virtual conveyance unit under a predetermined condition; and a virtual article management unit that sequentially updates the positions of the virtual articles in accordance with movement of the virtual conveyance unit, whereby a flow of articles is simulated.

Thus, the present embodiment enables achievement of the object, i.e., "accurately simulating a flow of articles in an environment similar to an actual worksite".

The foregoing summarizes the present embodiment.

Next, the configuration of the present embodiment will be described in detail with reference to the drawings.

Figure 1:
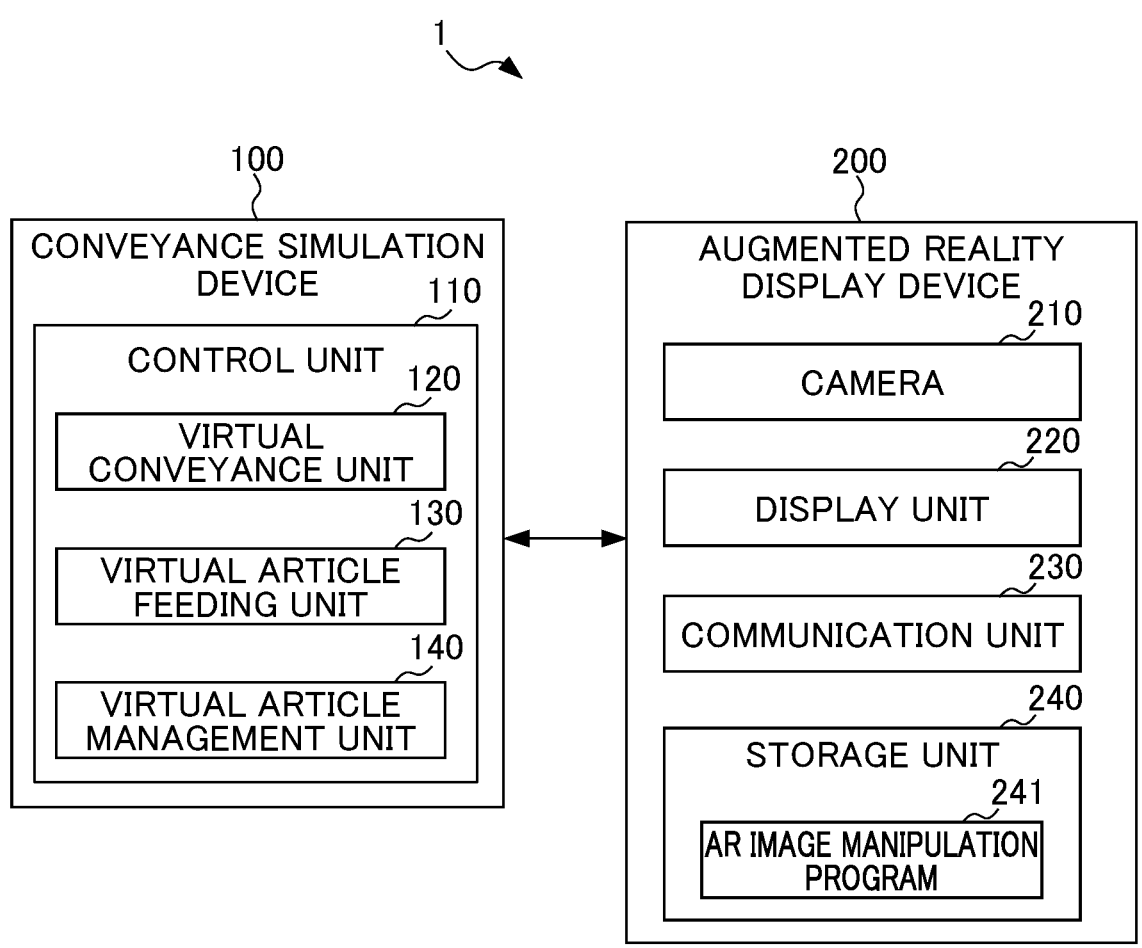
FIG. 1 is a block diagram showing an overall configuration of a conveyance simulation system according to a first embodiment.

FIG. 1 is a block diagram showing an overall configuration of a conveyance simulation system 1 according to the first embodiment. The conveyance simulation system 1 is composed of a conveyance simulation device 100 and an augmented reality display device 200.

The conveyance simulation device 100 and the augmented reality display device 200 may be connected to each other in a wired or wireless manner via a network (not shown) such as a local area network (LAN) or the Internet. In this case, the conveyance simulation device 100 and the augmented reality display device 200 include a communication unit (not shown) for the mutual communication via such a connection. The conveyance simulation device 100 and the augmented reality display device 200 may be directly connected to each other in a wired or wireless manner via a connection interface (not shown).

The conveyance simulation device 100 may include the augmented reality display device 200.

<Augmented Reality Display Device 200>

The augmented reality display device 200 is embodied as a smartphone, a tablet terminal, a head-mounted display, glasses with augmented reality (AR) display function, or the like. The augmented reality display device 200 has a control unit (not shown) such as a CPU, and an input unit (not shown) such as a keyboard or a touch panel, a camera 210, a display unit 220, a communication unit 230, and a storage unit 240.

The camera 210 captures an image of at least an actual worksite.

The display unit 220 is a liquid crystal display or the like, and displays the real space image captured by the camera 210 together with AR image data created by the conveyance simulation device 100 to be described later and representing a simulation result such that the real space image and the AR image data are superimposed on each other.

The communication unit 230 is connected to the conveyance simulation device 100 in a wired or wireless manner, and controls the communication with the conveyance simulation device 100.

The storage unit 240 is a ROM or the like, and stores a control program for controlling the operation of the augmented reality display device 200, and an AR image manipulation program 241 for manipulating an AR image to be displayed on the display unit 220.

In response to an input given by a user through the input unit (not shown), the augmented reality display device 200 may select an AR image to be displayed on the display unit 220 and may manipulate the selected AR image.

For example, based on the AR image manipulation program 241 stored in the storage unit 240, the augmented reality display device 200 may select an AR image in response to an input given by the user through the input unit (not shown), and may change a position and an attitude of the selected AR image. The augmented reality display device 200 may adjust, on an AR image, transparency of a graphic appearing in the AR image, or may adjust the size of a label such as an indicator, a letter, a numerical value, or the like in the AR image, in response to an input given by the user via the input unit (not shown). Further, the augmented reality display device 200 may perform switching on an AR image to display and hide each of graphics in the AR image in response to an input given by the user through the input unit (not shown).

<Conveyance Simulation Device 100>

As shown in FIG. 1, the conveyance simulation device 100 has a control unit 110. The control unit 110 includes a virtual conveyance unit 120, a virtual article feeding unit 130, and a virtual article management unit 140.

The control unit 110 includes a CPU, a ROM, a RAM, a CMOS memory, and the like, which are capable of communicating with one another via busses. These components are known to those skilled in the art.

The CPU is a processor for overall control of the conveyance simulation device 100. The CPU reads a system program and an application program stored in the ROM through the bus, and controls the whole conveyance simulation device 100 according to the system program and the application program. Thus, as shown in FIG. 1, the control unit 110 is configured to implement functions of the virtual conveyance unit 120, the virtual article feeding unit 130, and the virtual article management unit 140. The RAM stores various data such as temporary calculation data and display data. The CMOS memory is backed up by a battery (not shown) and is configured as a nonvolatile memory that is maintained in a storable state even when a power supply of the conveyance simulation device 100 is turned off.

<Virtual Conveyance Unit 120>

The virtual conveyance unit 120 is a virtual conveyer that is arranged in a virtual space for simulation, and corresponds to, for example, a conveyor to be installed at an actual worksite in the future. Based on a plan of a design stage, parameters of a length, a width, an installation position, and an installation orientation, and a velocity at which virtual articles are conveyed (hereinafter, also referred to as the "virtual conveying velocity") are set in the virtual conveyance unit 120. The virtual conveyance unit 120 is operated based on the set parameters, whereby a flow of articles is simulated. The virtual article is a vehicle body, a frame, a part, a food, a medicine, etc. that are virtually set.

During the simulation, the virtual conveyance unit 120 virtually operates at a constant virtual conveying velocity (e.g., 100 mm/sec) set for the simulation. Therefore, acceleration/deceleration of the conveying velocity, that is, the so-called "pulsation", does not occur, unlike an actual conveyor. The virtual article feeding unit 130 to be described later feeds the virtual articles to the virtual conveyance unit 120 at a preset feeding rate. Thus, the virtual conveyance unit 120 can convey the virtual articles at regular intervals determined based on the feeding rate and the virtual conveying velocity.

In the following description, the virtual conveying velocity of the virtual conveyance unit 120 is set to be 100 mm/sec, unless otherwise specified.

The virtual conveyance unit 120 includes at least one virtual lane set thereat.

Figure 2:
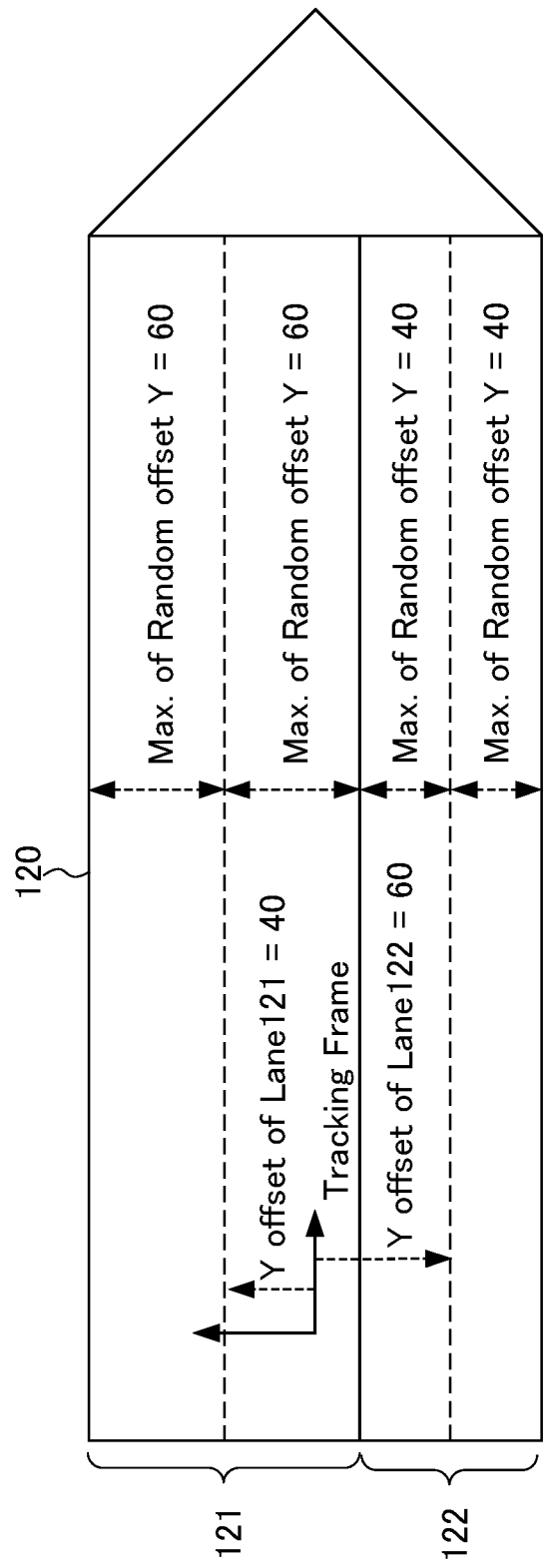
FIG. 2 is a diagram showing, as an example, virtual lanes set at a virtual conveyance unit.

FIG. 2 is a diagram showing, as an example, the virtual lanes set at the virtual conveyance unit 120. For example, in a case where two different types of articles are conveyed by the virtual conveyance unit 120, two virtual lanes 121, 122 are set at the virtual conveyance unit 120, as shown in FIG. 2.

In FIG. 2, the virtual conveyance unit 120 conveys the virtual articles at the set virtual conveying velocity in a direction indicated by the vertex of the triangle coordinate system (hereinafter, also referred to as the "conveyance coordinate system (tracking frame)") set at the virtual conveyance unit 120 defines a direction in which the virtual articles are conveyed as an X-axis, and a width direction of the virtual conveyance unit 120 as a Y-axis.

As shown in FIG. 2, the virtual lane 121 is set to be wider than the virtual lane 122. As will be described later, random offsets are set by each of which a position where the virtual articles are to be generated is randomly offset in the Y-axis direction with reference to a virtual article generation position (not shown) that is located on the centerline in an upstream region of the associated one of the virtual lanes 121, 122, the centerline being indicated by a broken line.

Although the virtual lane 121 is set to be wider than the virtual lane 122, this is a non-limiting example. The virtual lane 121 and the virtual lane 122 may be set to have the same width, or the virtual lane 121 may be set to be narrower than the virtual lane 122. That is, the widths of the virtual lanes 121, 122 may be appropriately determined according to the types of articles that are planned to be produced at the actual worksite.

Further, although the virtual conveyance unit 120 has the two virtual lanes 121, 122 set thereat, one virtual lane or three or more virtual lanes may be set. Although the articles conveyed on the virtual lanes 121, 122 are of different types, they may be of the same type.

<Virtual Article Feeding Unit 130>

The virtual article feeding unit 130 feeds the virtual articles to the virtual conveyance unit 120 under a predetermined condition.

Specifically, for the virtual article feeding unit 130, feeding schedules are set in advance as the predetermined condition.

Parameters set in each feeding schedule include, for example, a feeding rate and a feeding period (implementation period) or a total feeding distance. The feeding rate indicates the number of the virtual articles to be fed by the virtual article feeding unit 130 to the virtual lanes 121, 122 per unit time. The feeding period (implementation period) indicates a period during which the feeding schedule is implemented. In other words, the feeding period indicates a period during which the virtual article feeding unit 130 feeds the virtual articles to the virtual lanes 121, 122 based on the feeding schedule. The total feeding distance indicates an amount of movement that the virtual conveyance unit 120 performs during the implementation of one feeding schedule. For example, if the feeding schedule specifies that "the feeding period is 10 seconds or the total feeding distance is 1 m, and the feeding rate is 30 articles/minute", the interval at which the virtual articles are fed by the virtual article feeding unit 130 is determined to be 200 mm.

Note that one feeding schedule or a combination of two or more feeding schedules may be implemented for each of the virtual lanes 121, 122. The feeding schedule of the virtual lane 121 and that of the virtual lane 122 may be different from or the same as each other.

Figure 3:
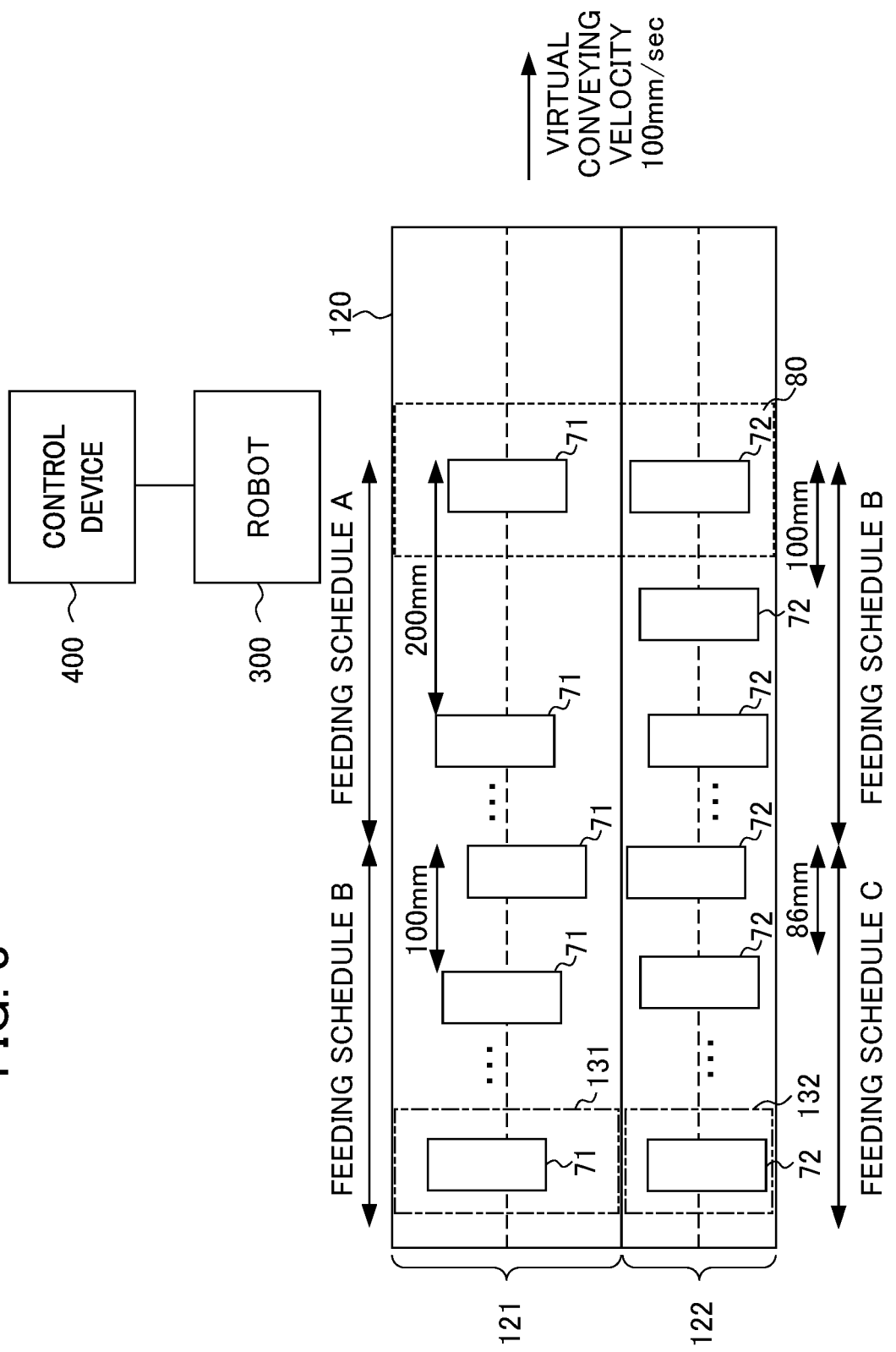
FIG. 3 is a diagram illustrating a case in which a virtual article feeding unit feeds virtual articles to virtual lanes based on feeding schedules, the virtual articles having been virtually generated at virtual article generation positions of the virtual lanes.

FIG. 3 is a diagram illustrating a case in which the virtual article feeding unit 130 feeds virtual articles 71, 72 to the virtual lanes 121, 122 based on the feeding schedules, the virtual articles 71, 72 having been virtually generated at the virtual article generation positions of the virtual lanes 121, 122. FIG. 3 shows, as random offset areas 131, 132, predetermined ranges which are each set with reference to the virtual article generation position, and in which the generated virtual article 71, 72 are randomly offset in the Y-axis direction.

As illustrated in FIG. 3, the virtual article feeding unit 130 repeatedly implements, at the virtual lane 121, a combination of a feeding schedule A specifying that "the feeding period is 10 seconds or the total feeding distance is 1 m, and the feeding rate is 30 articles/minute" and a feeding schedule B specifying that "the feeding period is 10 seconds or the total feeding distance is 1 m, and the feeding rate is 60 articles/minute". As shown in FIG. 3, the virtual article feeding unit 130 feeds the virtual articles 71 at intervals of 200 mm when implementing the feeding schedule A, and feeds the virtual articles 71 at intervals of 100 mm when implementing the feeding schedule B.

On the other hand, the virtual article feeding unit 130 repeatedly implements, at the virtual lane 122, a combination of the feeding schedule B specifying that "the feeding period is 10 seconds or the total feeding distance is 1 m, and the feeding rate is 60 articles/minute" and a feeding schedule C specifying that "the feeding period is 10 seconds or the total feeding distance is 1 m, and the feeding rate is 70 articles/minute". Thus, the virtual article feeding unit 130 feeds the virtual articles 72 at intervals of 100 mm when implementing the feeding schedule B, and feeds the virtual articles 72 at intervals of 86 mm when implementing the feeding schedule C.

Note that FIG. 3 shows part of the virtual articles 71, 72.

In the random offset areas 131, 132, the virtual article feeding unit 130 generates the virtual articles at the positions in the virtual lanes 121, 122, the positions having been randomly offset. Consequently, as shown in FIG. 3, each of the virtual articles 71, 72 is fed while being randomly shifted in the Y-axis direction with respect to the centerline of associated one of the virtual lanes 121, 122, the centerline being indicated by a broken line. Randomly correcting the positions where the virtual articles 71, 72 are generated in this way makes it possible to check, for example, whether a robot or the like to be installed at the actual worksite in the future will interfere with peripheral devices, and whether a cable extending on the robot or the like will be entangled.

Further, information indicating the type of article may be added to the virtual articles 71, 72 fed by the virtual article feeding unit 130.

Although the virtual articles 71, 72 shown in the drawings have a rectangular shape, this is a non-limiting example. The virtual articles may be displayed in any shape, or in the shape of an article to be produced actually.

Although the random offset areas 131, 132 are arranged at the position on the same X coordinate of the conveyance coordinate system, they may be arranged at positions of different X coordinates.

Not only the position but also the attitude may be randomly offset.

<Virtual Article Management Unit 140>

The virtual article management unit 140 sequentially updates the positions of the virtual articles 71, 72 in accordance with an amount of virtual movement of the virtual conveyance unit 120.

Specifically, the virtual article management unit 140 sequentially updates the positions of the virtual articles 71, 72 in the conveyance coordinate system based on, for example, the settings of the virtual conveyance unit 120 such as the position and attitude, the virtual conveying velocity, and the virtual lanes 121, 122, and the settings of the virtual article feeding unit 130 such as the feeding schedules.

For example, the virtual article management unit 140 sequentially calculates an amount of movement of the virtual articles 71, 72 with reference to a point of time at, which the virtual article feeding unit 130 fed the virtual articles to the virtual lanes 121, 122, based on the virtual conveying velocity of the virtual conveyance unit 120. From the calculated amount of movement of the virtual articles 71, 72, the virtual article management unit 140 sequentially updates the positions of the virtual articles 71, 72 in the conveyance coordinate system, on the virtual lanes 121, 122. In this way, as shown in FIG. 3, a situation can be simulated in which the virtual articles 71, 72 are conveyed on the virtual conveyance unit 120 in the same direction as the conveying direction of the conveyor (conveyance unit) to be installed in the future.

For example, if a robot 300 and a control device 400 for controlling the robot 300 have been installed at the actual worksite as shown in FIG. 3, the control device 400 may receive data of the positions of the virtual articles 71, 72 from the conveyance simulation device 100. In this case, when the data of the positions of the virtual articles 71, 72 indicates that the virtual articles 71, 72 have moved to a work area 80 of the robot 300 represented by a dashed rectangle, the control device 400 may cause the robot 300 to perform movement for taking out the virtual articles 71, 72, and movement for placing them on an unloading conveyor or the like to be installed. This makes it possible to check, for example, whether the robot 300 moves as designed, and whether there is an obstacle to the motion of the robot 300. Further, in the case where the intervals between the virtual articles 71 are intentionally varied by way of the above-described combination of the feeding schedules A and B, it is possible to check whether a temporary placing table as a buffer is needed when the robot 300 takes out the articles, for example.

In this case, a coordinate system of the robot 300, the conveyance coordinate system of the virtual conveyance unit 120, and a camera coordinate system of the camera 210 of the augmented reality display device 200 are associated with each other in advance. For example, a reference coordinate system usable as the coordinate system of the robot 300 and the virtual conveyance unit 120 may be set by causing a setting tool provided at a distal end of the robot 300 to contact with a plurality of predetermined points of a calibration jig placed at a position where the conveyor (virtual conveyance unit 120) is to be installed. Further, the camera 210 may capture an image of a mark affixed to the calibration jig or the robot 300, and the camera coordinate system of the camera 210 may be associated with the reference coordinate system based on the image.

<Process of Generating AR Images>

The control unit 110 executes an AR image generation program stored in, for example, a storage unit (not shown), and sequentially generates AR image data of the virtual conveyance unit 120 and the virtual articles, based on a preset motion program of the robot 300, the settings of the virtual conveyance unit 120, the setting of the virtual article feeding unit 130, and the positions of the virtual articles 71, 72 in the conveyance coordinate system sequentially updated by the virtual article management unit 140.

The control unit 110 transmits the generated AR image data to the augmented reality display device 200. The augmented reality display device 200 adjusts the position and attitude included in the received AR image data on the basis of the camera coordinate system or the reference coordinate system, and displays an image of the real space captured by the camera 210 and the received AR images.

Figure 4:
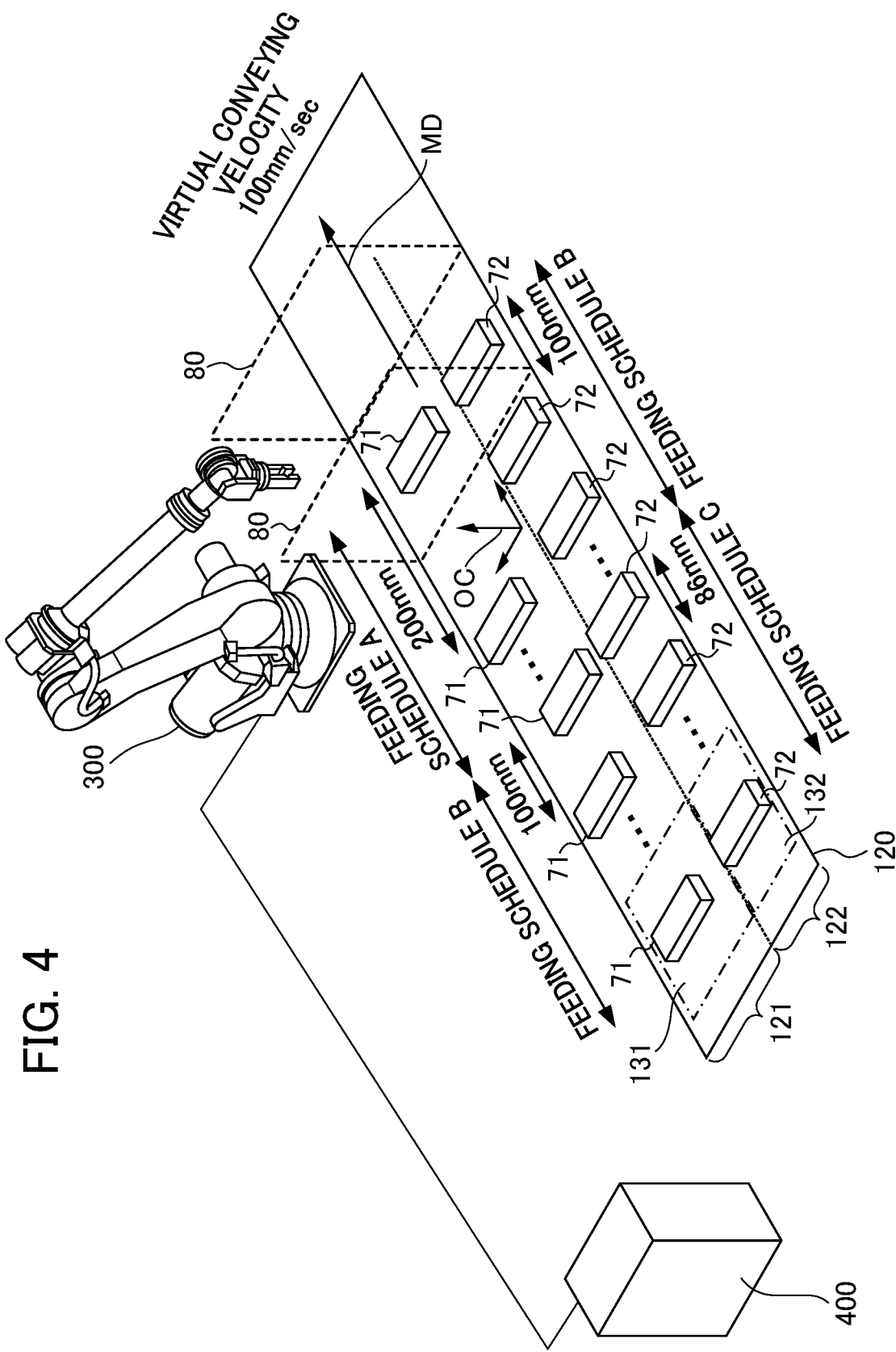
FIG. 4 shows, as an example, what is displayed by an augmented reality display device.

FIG. 4 shows, as an example, what is displayed by the augmented reality display device 200.

As shown in FIG. 4, the display unit 220 of the augmented reality display device 200 displays an image of the real space captured by the camera 210 of the augmented reality display device 200 and including the robot 300 and the control device 400, together with the AR images generated by the control unit 110.

In the displayed. AR image, the virtual conveyance unit 120 is displayed as a planar virtual conveyor, and each of the virtual articles 71, 72 conveyed at a virtual conveying velocity (e.g., 100 mm/sec) in a conveying direction MD indicated by an arrow.

As shown in FIG. 1, the control unit 110 may generate AR images of the random offset areas 131, 132, and an AR image of the work area 80, together with the AR images of the virtual conveyance unit 120 and the virtual articles 71, 72. Displaying these AR images allows a user of the augmented reality display device 200 to intuitively recognize, for example, a relationship between the random offset areas 131, 132 and the work area 80, a relationship between the work area 80 and a range where an operator works, a relationship between the work area 80 and a work area of another robot, the sizes of the random offset areas 131, 132, and the work area 80 with respect to the contents of work.

Further, as shown in FIG. 4, the control unit 110 may generate informational AR images indicating the feeding schedules A and B that are currently implemented, and the distance between the virtual articles 71 on the virtual lane 121, and the distance between the virtual articles 72 on the virtual lane 122. Furthermore, in the case of adding information indicating the type of article to the virtual articles 71, 72 fed by the virtual article feeding unit 130, the control unit 110 may generate an informational AR image indicating the type of article of the virtual articles 71, 72.

In this way, the user of the augmented realty display device 200 can visually check an operation state according to the current feeding schedules A and B and the types of the fed virtual articles 71, 72, and thereby can check whether the current feeding schedules A and B are suitable.

Further, the control unit 110 may generate an AR image of a motion restriction area of the robot 300. The motion restriction area is set around an operator, peripheral devices, or the like, and is an area where the motion of the robot 300 is stopped or restricted. With the AR image of the motion restriction area, the user of the augmented reality display device 200 can intuitively recognize a set range of the motion restriction area.

Further, as shown in FIG. 4, the control unit 110 may generate an AR image of a reference coordinate system OC that is set with respect to the robot 300, and an AR image of the conveying direction MD of the virtual conveyance unit 120. These AR images allow the user of the augmented reality display device 200 to visually check a relationship between the reference coordinate system OC and the conveying direction MD, and to check whether the conveying direction MD of the virtual conveyance unit 120 is suitable with respect to the settings such as the reference coordinate system OC.

The virtual articles 71, 72 displayed in the AR image have a cubic shape. However, they may be displayed in any shape and may be displayed in the shape of an article to be produced actually.

The augmented reality display device 200 may generate the AR image by acquiring data of simulation results from the conveyance simulation device 100.

The AR image may be a three-dimensional image or a two-dimensional image.

Further, the reference coordinate system OC may be associated automatically. Alternatively, the user of the augmented reality display device 200 may directly manipulate the AR image to manually match the coordinate system.

<Simulation Process of Conveyance Simulation Device 100>

Next, an operation related to a simulation process of the conveyance simulation device 100 according to the first embodiment will be described.

Figure 5:
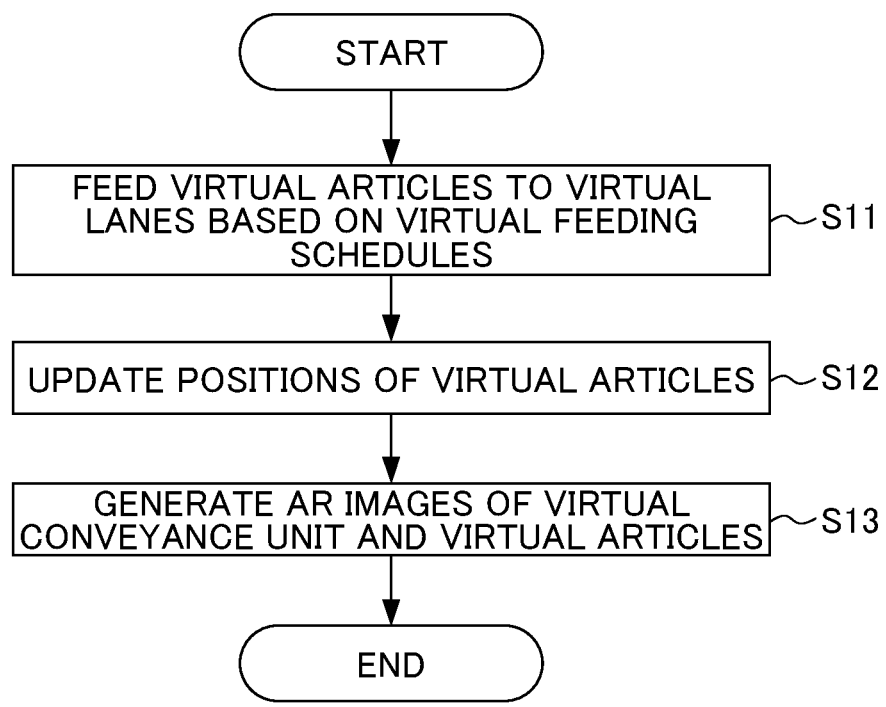
FIG. 5 is a flowchart illustrating a simulation process of the conveyance simulation device.

FIG. 5 is a flowchart illustrating the simulation process of the conveyance simulation device 100. The set of steps in the shown flowchart is repeatedly executed during the simulation process.

In Step S11, the virtual article feeding unit 130 feeds the virtual articles 71, 72 to the respective virtual lanes 121, 122 of the virtual conveyance unit 120, based on the feeding schedules.

In Step S12, the virtual article management unit 140 sequentially updates the positions of the virtual articles 71, 72 in accordance with virtual movement of the virtual conveyance unit 120.

In Step S13, the control unit 110 sequentially generates AR images of the virtual conveyance unit 120 and the virtual articles 71, 72, based on the preset motion program of the robot 300, the settings of the virtual conveyance unit 120, the settings of the virtual article feeding unit 130, and the positions of the virtual articles 71, 72 sequentially updated in Step S12.

Through the above steps, the conveyance simulation device 100 of the first embodiment generates the virtual articles 71, 72 on the virtual conveyance unit 120 arranged in the virtual space based on the plan of the design stage of the actual worksite, and conveys the virtual articles 71, 72 at a preset virtual conveying velocity, thereby simulating the flow of articles. Thus, the conveyance simulation device 100 can simulate the flow of articles accurately in an environment similar to the actual worksite.

Further, the conveyance simulation device 100 generates AR images based on the simulation results and causes the augmented reality display device 200 to display the image of a real space corresponding to the actual worksite together with the AR images. Thus, the user of the augmented reality display device 200 can check, in a state in which peripheral devices are absent from the actual worksite, whether there is an obstacle interfering with the motion of the robot 300 at the actual worksite, based on the plan of the design stage, and can check whether the performance of the robot 300 is as expected.

In the foregoing, the first embodiment has been described.

Second Embodiment

A conveyance system 2 according to a second embodiment differs from the first embodiment in that a conveyance unit is installed at an actual worksite, a virtual article feeding unit 130*a* feeds virtual articles to the conveyance unit under a predetermined condition, and a virtual article management unit 140*a* sequentially updates positions of the virtual articles in accordance with an amount of movement of the conveyance unit, thereby simulating a flow of articles.

Thus, the conveyance system 2 can simulate the flow of articles accurately in an environment similar to the actual worksite.

The second embodiment will be described below.

Figure 6:
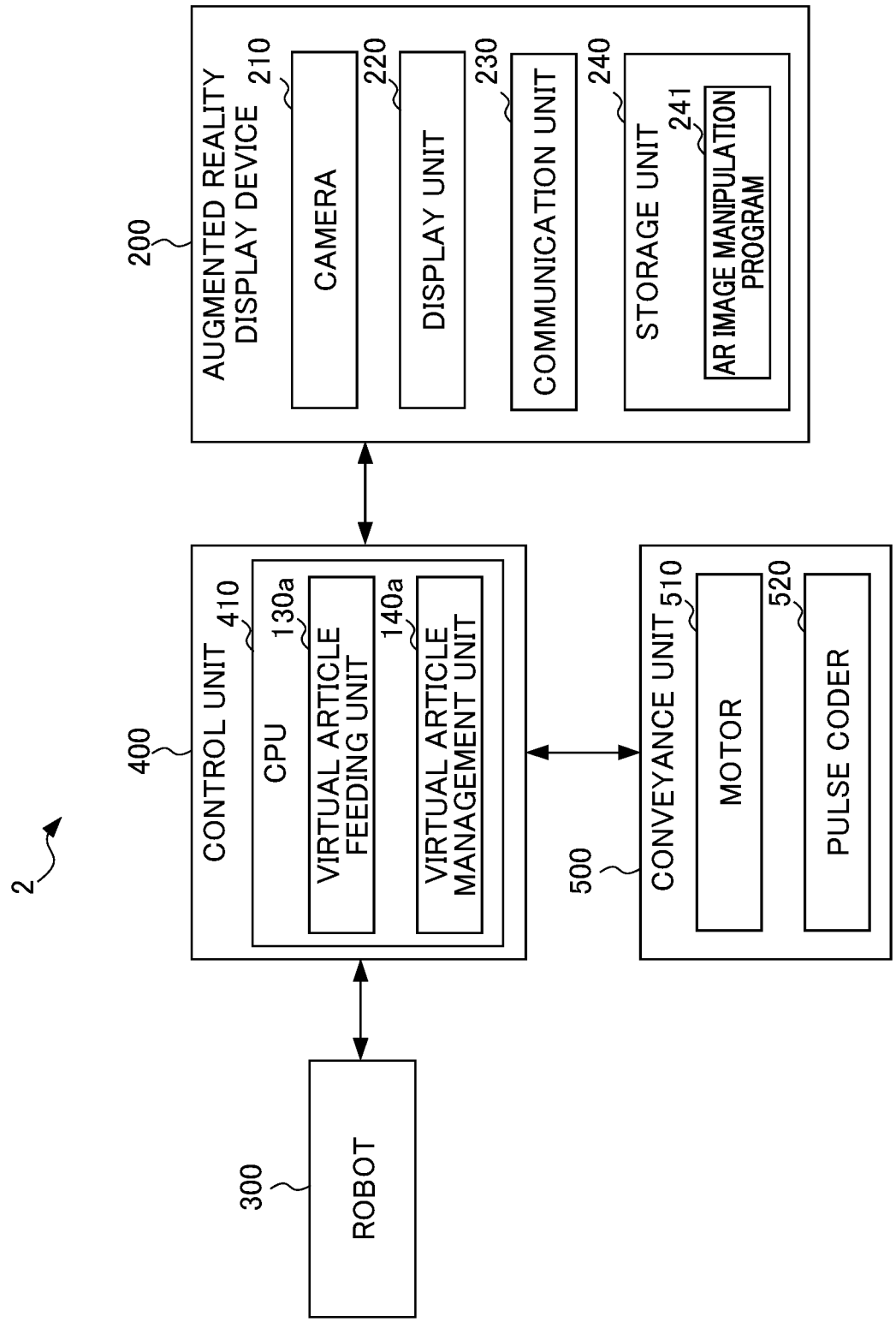
FIG. 6 is a block diagram showing an overall configuration of a conveyance system according to a second embodiment.

FIG. 6 is a block diagram showing an overall configuration of the conveyance system according to the second embodiment. Note that elements that are the same or similar in function to those shown in FIG. 1 are denoted by the same reference characters, and a detailed description thereof will be omitted.

As shown in FIG. 6, the conveyance system 2 includes an augmented reality display device 200, a robot 300, a control device 400, and a conveyance unit 500.
<Conveyance Unit 500>

The conveyance unit 500 is a conveyor that is installed at an actual worksite, conveys articles, and includes a motor 510 and a pulse coder 520.

The motor 510 actuates the conveyance unit 500 by being driven based on a control command sent from the control device 400.

The pulse coder 520 as a movement amount detection unit sequentially detects an amount of movement of the conveyance unit 500 as a rotational position and an amount of rotation of an output shaft of the motor 510. The pulse coder 520 transmits the detected values to the control device 400. An encoder or the like may be provided instead of the pulse coder 520.

In the conveyance simulation according to the second embodiment, a length, a width, an installation position, and an installation orientation of the conveyance unit 500 are set as parameters of the conveyance unit 500. The amount of movement of the conveyance unit 500 is calculated from the values detected by the pulse coder 520 while the conveyance unit 500 actually operates based on the control command given by the control device 400. That is, the flow of articles is simulated by causing the conveyance unit 500 to operate actually.

The conveyance unit 500 is operated because even if the control device 400 controls and causes the motor 510 of the conveyance unit 500 to rotate at a constant velocity, acceleration/deceleration of the conveying velocity, i.e., the so-called "pulsation" occurs, making it difficult to feed the articles at regular intervals. To address this, the virtual article feeding unit 130*a* to be described later feeds virtual articles at predetermined intervals based on the amount of movement of the conveyance unit 500, whereby feeding at regular intervals is achieved.

At least one virtual lane is set on a surface of the conveyance unit 500 on which the articles are conveyed.

Figure 7:
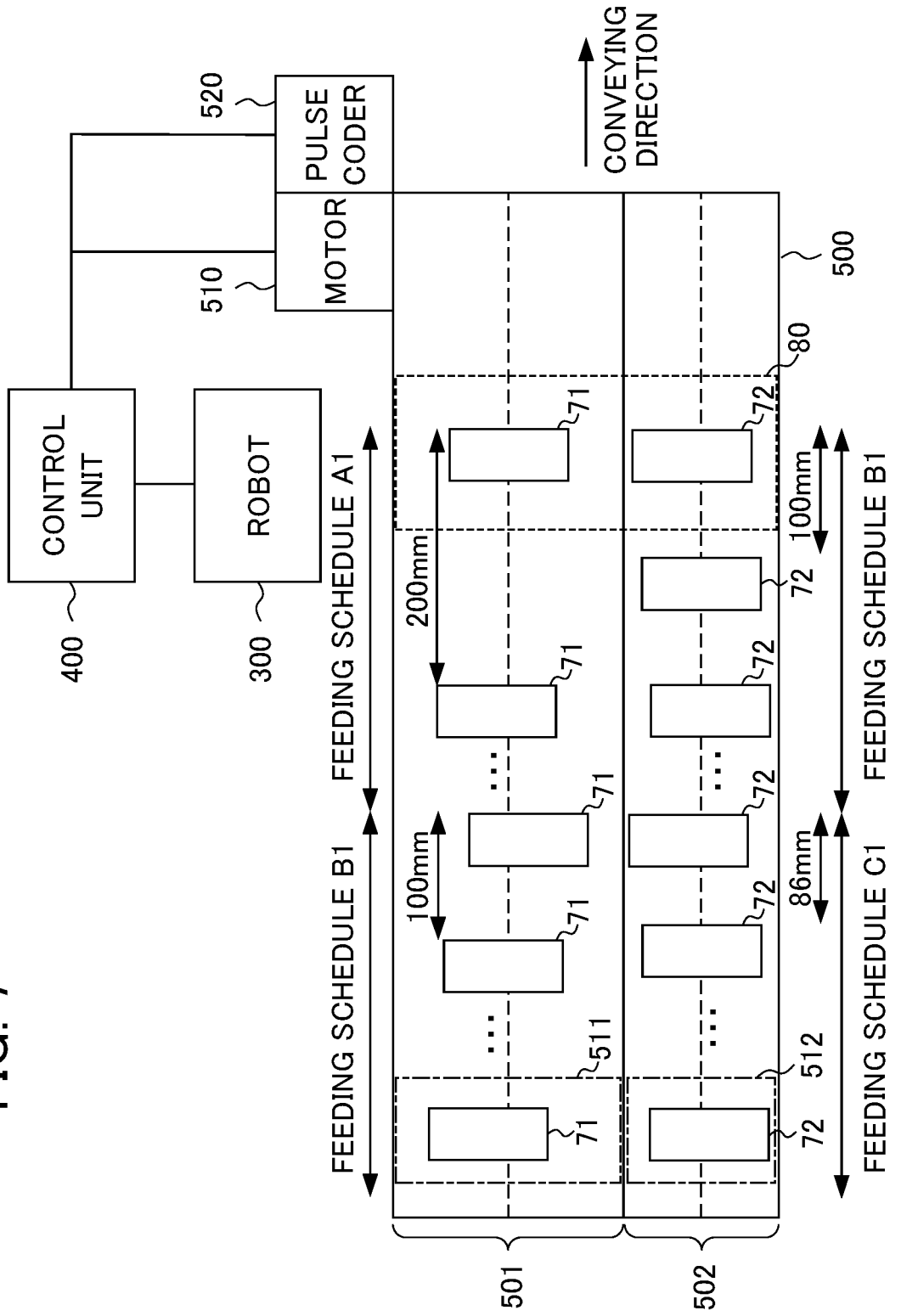
FIG. 7 is a diagram showing, as an example, virtual lanes set at a conveyance unit.

FIG. 7 is a diagram showing, as an example, the virtual lanes set at the conveyance unit 500. As shown in FIG. 7, for example, when articles of two different types are conveyed by the conveyance unit 500, two virtual lanes 501, 502 are set at the conveyance unit 500.

The conveyance unit 500 conveys the virtual articles in a conveying direction corresponding to the upward direction in FIG. 7. Therefore, as in FIG. 2, a conveyance coordinate system (not shown) in which the conveying direction is defined as an X-axis and the width direction of the conveyance unit 500 is defined a Y-axis is set in the conveyance unit 500.

As shown in FIG. 7, the virtual lane 501 is set to be wider than the virtual lane 502, as in the case of FIG. 2. Further, random offset areas 511, 512 are set in each of which a position at which the virtual article is to be generated is randomly offset in the Y-axis direction with reference to a virtual article generation position (not shown) that is located on the centerline in an upstream region of the associated one of the virtual lanes 501, 502, the centerline being indicated by a broken line.

Although the virtual lane 501 is set to be wider than the virtual lane 502, this is a non-limiting example. The virtual lane 501 and the virtual lane 502 may set to have the same width, or the virtual lane 501 may be set to be narrower than the virtual lane 502. That is, the widths of the virtual lanes 501, 502 may be appropriately determined according to the types of articles that are planned to be produce at the actual worksite.

Although the virtual conveyance unit 500 has the two virtual lanes 501, 502 set thereon, one virtual lane or three or more virtual lanes may be set. Although the articles conveyed on the virtual lanes 501, 502 are of different types, they may be of the same type.
<Control Device 400>

The control device 400 is a robot-controlling device known to those skilled in the art, generates a motion command based on control information, and transmits the generated motion command to the robot 300. The control device 400 thus controls the motion of the robot 300. The control device 400 also controls the motion of the conveyance unit 500. If a machine tool or the like is used in place of the robot 300, the control device 400 may be a numerical control device or the like.

As shown in FIG. 6, the control device 400 has a control unit 410. Further, the control unit 410 has the functions of the virtual article feeding unit 130*a* and the virtual article management unit 140*a*.

The control unit 410 includes a CPU, a ROM, a RAM, a CMOS memory, and the like, which are capable of communicating with one another via busses. These components are known to those skilled in the art.

The CPU is a processor for overall control of the control device 400. The CPU reads a system program and an application program stored in the ROM through the bus, and controls the whole control device 100 according to the system program and the application program. Thus, as shown in FIG. 6, the control unit 410 is configured to implement the functions of the virtual article feeding unit 130*a* and the virtual article management unit 140*a*.

<Virtual Article Feeding Unit 130*a*>

The virtual article feeding unit 130*a* feeds the virtual articles to the conveyance unit 500 under a predetermined condition.

Specifically, for the virtual article feeding unit 130*a*, feeding schedules are set in advance as the predetermined condition.

Parameters set in each feeding schedule include, for example, a feeding period (implementation period), a total feeding distance, and a predetermined interval. For example, if the feeding schedule specifies that "the feeding period is 10 seconds or the total feeding distance is 1 m, and the predetermined interval is 200 mm", the virtual article feeding unit 130*a* feeds the virtual articles at regular intervals of 200 mm based on the amount of movement of the conveyance unit 500.

Note that one feeding schedule or a combination of two or more feeding schedules may be implemented for each of the virtual lanes 501, 502. The feeding schedule of the virtual lane 501 and that of the virtual lane 502 may be different from or the same as each other.

For example, as shown in FIG. 7, the virtual article feeding unit 130*a* repeatedly implements, at the virtual lane 501, a combination of a feeding schedule A1 specifying that "the feeding period is 10 seconds or the total feeding distance is 1 m, and the predetermined interval 200 mm" and a feeding schedule B1 specifying that "the feeding period is 10 seconds or the total feeding distance is 1 m, and the predetermined interval is 100 mm". In this case, the virtual article feeding unit 130*a* sequentially calculates the amount of movement of the conveyance unit 500 from the detected values received from the pulse coder 520 of the conveyance unit 500, and feeds the virtual article 71 every time the amount of movement of the conveyance unit 500 increases by 200 mm when implementing the feeding schedule A1. Further, the virtual article feeding unit 130*a* feeds the virtual article 71 every time the amount of movement of the conveyance unit 500 increases by 100 mm when implementing the feeding schedule B1.

On the other hand, as shown in FIG. 7, the virtual article feeding unit 130*a* repeatedly implements, at the virtual lane 502, a combination of the feeding schedule B1 specifying that "the feeding period is 10 seconds or the total feeding distance is 1 m, and the predetermined interval is 100 mm" and a feeding schedule C1 specifying that "the feeding period is 10 seconds or the total feeding distance is 1 m, and the predetermined interval is 86 mm". Thus, the virtual article feeding unit 130*a* feeds the virtual article 72 every time the amount of movement of the conveyance unit 500 increases by 100 mm when implementing the feeding schedule B1, and feeds the virtual article 72 every time the amount of movement of the conveyance unit 500 increases by 86 mm when implementing the feeding schedule C1.

Note that FIG. 7 shows part of the virtual articles 71, 72, like FIG. 3.

In the random offset areas 511, 512, the virtual article feeding unit 130*a* generates the virtual articles at positions in the virtual lanes 501, 502, the positions having been randomly offset. Consequently, as shown in FIG. 7, each of the virtual articles 71, 72 is fed while being randomly shifted in the Y-axis direction with respect to the centerline of associated one of the virtual lanes 501, 502, the centerline being indicated by a broken line. Randomly correcting the positions where the virtual articles 71, 72 are generated in this way makes it possible to check, for example, whether the robot 300 installed at the actual worksite will interfere with peripheral devices, and whether a cable extending on the robot 300 will be entangled.

Further, the virtual article feeding unit 130*a* may add information indicating the type of article to the virtual articles 71, 72 to be fed.

<Virtual Article Management Unit 140*a*>

The virtual article management unit 140*a* sequentially updates the positions of the virtual articles 71, 72 in accordance with the amount of movement of the conveyance unit 500.

Specifically, the virtual article management unit 140*a* sequentially updates the positions of the virtual articles 71, 72 in the conveyance coordinate system based on, for example, the settings of the conveyance unit 500 such as the position and attitude, the amount of movement, and the virtual lanes 501, 502, and the settings of the virtual article feeding unit 130*a* such as the feeding schedules.

For example, from the detected values received from the pulse coder 520 of the conveyance unit 500, the virtual article management unit 140*a* sequentially calculates the amount of movement of the conveyance unit 500 with reference to a point of time at which the virtual article feeding unit 130*a* fed the virtual articles 71, 72 to the virtual lanes 501, 502. The virtual article management unit 140*a* sequentially updates the positions of the virtual articles on the virtual lanes 501, 502 in the conveyance coordinate system, in accordance with the amount of movement of the conveyance unit 500. In this way, as shown in FIG. 7, a situation can be simulated in which the virtual articles 71, 72 are conveyed on the conveyance unit 500 in the same direction as the conveying direction of the conveyance unit 500.

<Process of Generating AR Images>

Like the control unit 110 shown in FIG. 1, for example, the control unit 410 executes an AR image generation program stored in a storage unit (not shown), and sequentially generates AR image data of the virtual articles 71, 72, based on a preset motion program of the robot 300, the settings of the conveyance unit 500, the setting of the virtual article feeding unit 130*a*, and the positions of the virtual articles 71, 72 sequentially updated by the virtual article management unit 140*a*.

The control unit 410 transmits the generated AR image data to the augmented reality display device 200. The augmented reality display device 200 adjusts the position and attitude included in the received AR image data on the basis of a camera coordinate system or a reference coordinate system, and displays an image of the real space captured by the camera 210 together with the received AR images.

A coordinate system of the robot 300, the conveyance coordinate system of the conveyance unit 500, and the camera coordinate system of the camera 210 of the augmented reality display device 200 are associated with each other in advance. For example, a reference coordinate system OC usable as the coordinate system of the robot 300 and the conveyance unit 500 may be set by causing a setting tool provided at a distal end of the robot 300 to contact with a plurality of predetermined points of a calibration jig placed at the conveyance unit 500. Further, the camera 210 may capture an image of a mark affixed to the calibration jig or the robot 300, and the camera coordinate system of the camera 210 may be associated with the reference coordinate system OC based on the image.

Figure 8:
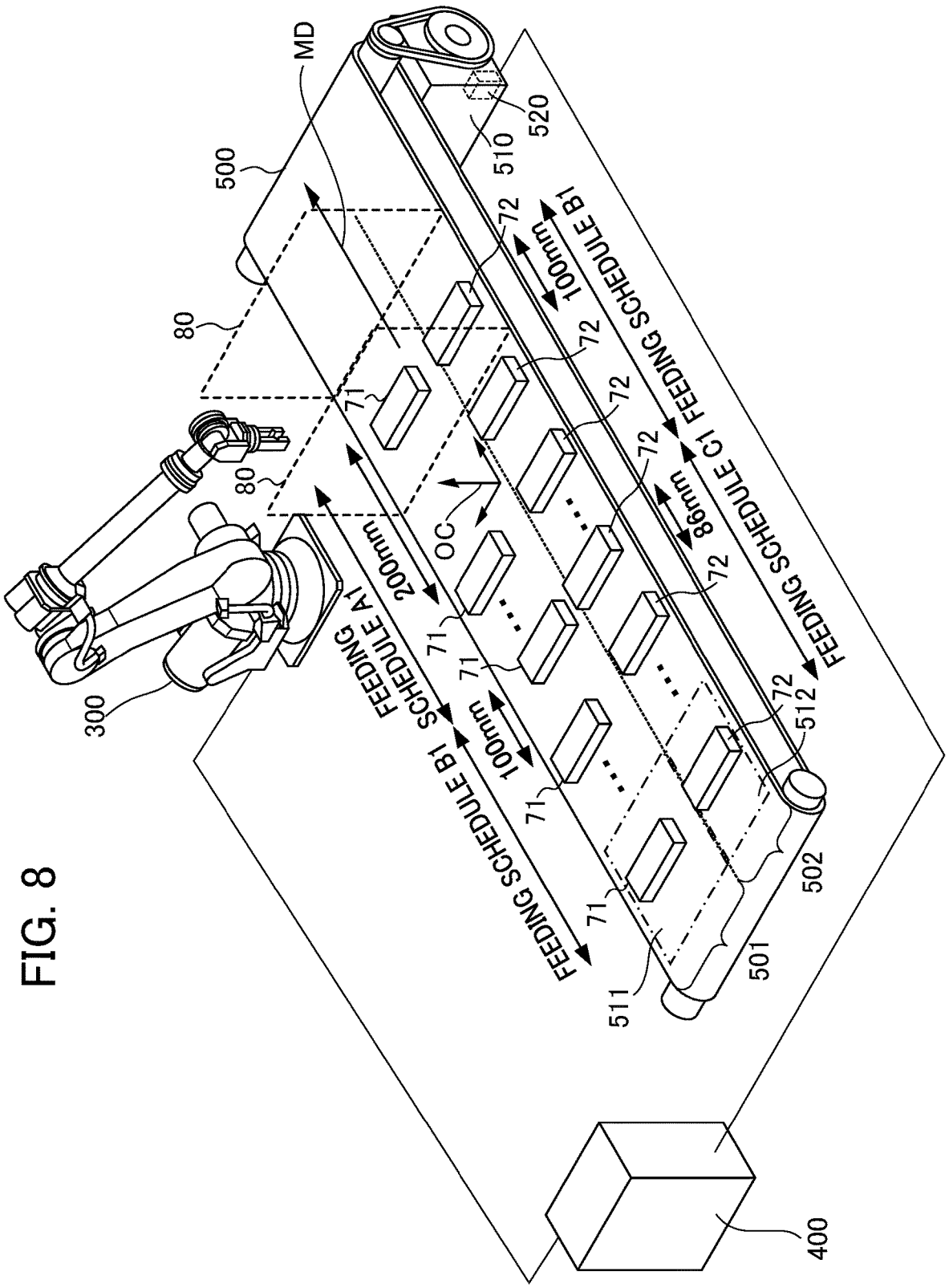
FIG. 8 shows, as an example, what is displayed by an augmented reality display device.

FIG. 8 shows, as an example, what is displayed by the augmented reality display device 200.

As shown in FIG. 8, the display unit 220 of the augmented reality display device 200 displays an image of the real space captured by the camera 210 of the augmented reality display device 200 and including the robot 300, the control device 400, together with the conveyance unit 500, and the AR images generated by the control unit 410.

In the displayed AR image, the virtual articles 71, 72 are conveyed on the conveyance unit 500 in a conveying direction MD indicated by an arrow.

When the data of the positions of the virtual articles 71, 72 indicates that the virtual articles 71, 72 have moved to a work area 80 of the robot 300 represented by a dashed rectangle, the control device 400 may cause the robot 300 to perform movement for taking out the virtual articles 71, 72, and movement for placing them on an unloading conveyor or the like (not shown). This makes it possible to check, for example, whether the robot 300 moves as designed, and whether there is an obstacle to the motion of the robot 300. Further, in the case where the intervals between the virtual articles 71 are intentionally varied by way of the above-described combination of the feeding schedules A1 and B1, it is possible to check whether a temporary placing table as a buffer is needed when the robot 300 takes out the articles, for example.

<Simulation Process of Conveyance system 2>

Next, an operation related to a simulation process of the conveyance system 2 according to the second embodiment will be described.

Figure 9:
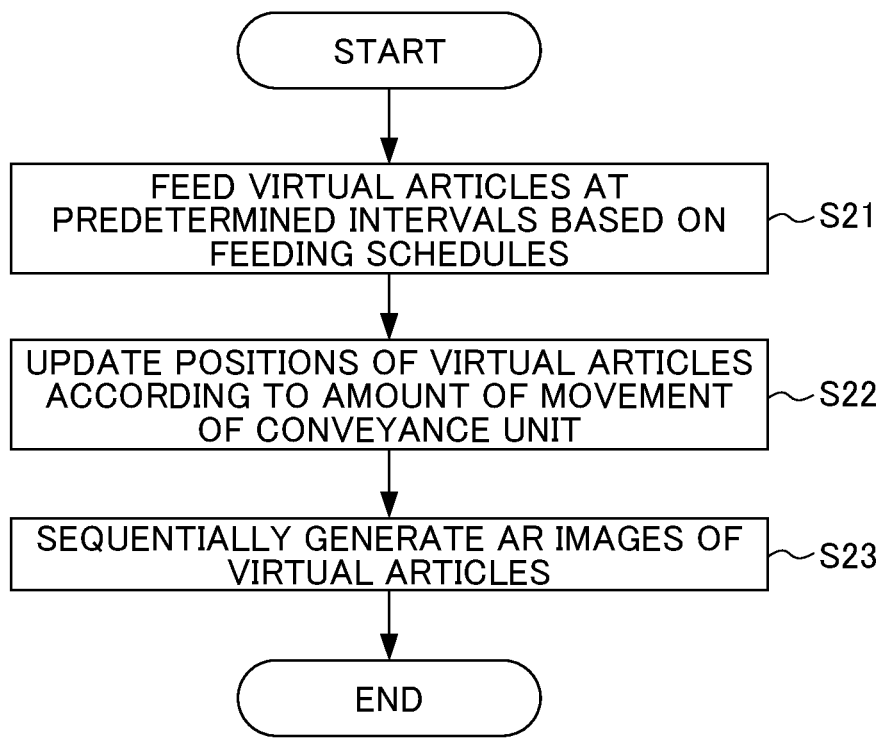
FIG. 9 is a flowchart illustrating a simulation process of the conveyance system.

FIG. 9 is a flowchart illustrating the simulation process of the conveyance system 2. The set of steps in the shown flowchart is repeatedly executed during the simulation process.

In Step S21, the virtual article feeding unit 130a feeds the virtual articles 71, 72 at the predetermined intervals to the respective virtual lanes 501, 502 of the conveyance unit 500, based on the feeding schedules.

In Step S22, the virtual article management unit 140a sequentially updates the positions of the virtual articles 71, 72 in accordance with the amount of movement of the conveyance unit 500.

In step S23, the control unit 410 sequentially generates AR images of the virtual articles 71, 72 based on the preset motion program of the robot 300, the settings of the conveyance unit 500, the settings of the virtual article feeding unit 130a, and the positions of the virtual articles 71, 72 sequentially updated in Step S22.

Through the above steps, the conveyance system 2 of the second embodiment generates the virtual articles 71, 72 on the conveyance unit 500 installed at the actual worksite and conveys the virtual articles 71, 72 in accordance with the amount of movement of the conveyance unit 500, thereby simulating the flow of articles. Thus, the conveyance system 2 can simulate the flow of articles accurately in an environment similar to the actual worksite.

Further, the conveyance system 2 generates AR images based on the simulation results and causes the augmented reality display device 200 to display the image of a real space corresponding to the actual worksite together with the AR images. Thus, the user of the augmented reality display device 200 can check, in a state in which the conveyance unit 500 has been installed, whether the robot 300 interferes with peripheral devices, whether there is an obstacle interfering with the motion of the robot 300 at the actual worksite, and whether the performance of the robot 300 is as expected.

In the foregoing, the second embodiment has been described.

It should be noted that the present disclosure is not limited to the first and second embodiments described above, but encompasses various modifications and improvements within the range where the object of the present disclosure is achievable.

Modification 1

In the first embodiment described above, the conveyance simulation device 100 is constituted by a single computer. However, the present disclosure is not limited thereto. For example, the conveyance simulation device 100 may be included in the control device 400.

Further, a server or the like may include part or all of the virtual conveyance unit 120, the virtual article feeding unit 130, and the virtual article management unit 140 of the conveyance simulation device 100. The functions of the conveyance simulation device 100 may be implemented using a virtual server function or the like on a cloud.

Furthermore, the conveyance simulation device 100 may be configured as a distributed processing system in which the functions of the conveyance simulation device 100 are appropriately distributed to a plurality of servers.

Likewise, a server or the like may include part or all of the virtual article feeding unit 130a and the virtual article management unit 140a of control device 400 according to the second embodiment. In addition, the functions of the control device 400 may be implemented using a virtual server function or the like on a cloud.

Furthermore, the control device 400 may be configured as a distributed processing system in which the functions of the control device 400 are appropriately distributed to a plurality of servers.

Modification 2

In the above-described first and second embodiments, the flow of articles is simulated on the assumption that the robot 300 operates to take out the articles, for example. However, the present disclosure is not limited thereto. For example, the configuration of the conveyance simulation device 100 and that of the conveyance system 2 can be applied to a system in which the robot 300 implements a different operation such as machining, assembly, inspection, or observation of articles.

Further, the configuration of the conveyance simulation device 100 and that of the conveyance system 2 can be applied to a system that does not use the robot 300. Such a system that does not use the robot 300 may be, for example, an automatic coating system including, instead of the robot 300, a plurality of coating guns (predetermined devices) arranged at predetermined upstream locations of the virtual conveyance unit 120 or the conveyance unit 500, or a cleaning system including a cleaning nozzle (predetermined device) arranged at a predetermined upstream location of the virtual conveyance unit 120 or the conveyance unit 500.

In the case where the system not using the robot 300 is an inspection system, for example, an inspection sensor (predetermined device) in place of the robot 300 may be arranged at an upstream location of the virtual conveyance unit 120 or the conveyance unit 500, and the control device 400 may perform image processing and determination using a detected image provided by the inspection sensor.

Modification 3

In the above-described first and second embodiments, the augmented reality display device 200 displays the image of the real space including the robot 300 and other devices, and AR images including the virtual articles 71, 72. However, the present disclosure is not limited thereto. For example, the operation of the virtual conveyance unit 120 or the conveyance unit 500 and the start and stop of feeding of the virtual articles 71, 72 by the virtual article feeding unit 130 or 130a may be operable by way of the augmented reality display device 200, based on an AR image manipulation program 241 stored in the storage unit 240.

Note that each of the functions included in the conveyance simulation device 100 according to the first embodiment and the conveyance system 2 according to the second embodiment can be implemented by hardware, software, or a combination thereof. Here, the implementation by software means that a computer reads and executes a program for the implementation.

The program can be stored in various types of nontemporary computer readable media (non-transitory computer readable media) and can be provided to a computer. The non-transitory computer readable media include various types of substantive recording media (tangible storage media). Examples of the non-transitory computer readable media include a magnetic recording medium (e.g., a flexible disk, a magnetic tape, a hard disk drive), a magnetic-optical recording medium (e.g., a magnetic optical disk), a read only memory (CD-ROM), a CD-R, a CD-R/W, and a semiconductor memory (e.g., a mask ROM, a programmable ROM (PROM), an erasable PROM (EPROM), a flash ROM, and a RAM). The program may be provided to the computer by way of various types of temporary computer-readable media (transitory computer readable media). Examples of the transitory computer readable media include an electrical signal, an optical signal, and an electromagnetic wave. The transitory computer readable medium can provide a program to the computer through a wired communication line, such as a wire and an optical fiber, or through a wireless communication.

Steps of describing the program to be recorded on a recording medium include not only processes that are executed in time sequence according to the respective order, but also processes that are executed in parallel or individually and not necessarily in time sequence.

In other words, the simulation device and the conveyance system of the present disclosure encompass various embodiments having the following features:

(1) A conveyance simulation device 100 of the present disclosure includes: a virtual conveyance unit 120 that operates virtually; a first virtual article feeding unit 130 that feeds virtual articles 71, 72 to the virtual conveyance unit 120 under a predetermined condition; and a virtual article management unit 140 that sequentially updates positions of the virtual articles 71, 72 in accordance with a virtual movement of the virtual conveyance unit 120.

The conveyance simulation device 100 makes it possible to accurately simulate a flow of articles in an environment similar to an actual worksite.

(2) In the conveyance simulation device 100 according to (1) above, the virtual conveyance unit 120 may have at least one virtual lane 121, 122, the virtual lane 121, 122 may have a virtual conveying velocity, the virtual lane 121, 122 may have a virtual article generation position for virtually generating the virtual articles 71, 72, the virtual lane 121, 122 may convey the virtual articles 71, 72 in a same direction as a conveying direction of a conveyance unit to be actually installed, and the virtual articles 71, 72 may be generated at a position on the virtual lane 121, 122, the position being randomly offset within a random offset area 131, 132 with reference to the virtual article generation position.

This feature enables the virtual lane 121 to convey articles of one type at a feeding rate and the virtual lane 122 to convey articles of another type at a different feeding rate. The random offset allows a user to check whether a robot or the like to be installed at the actual worksite in the future will interfere with peripheral devices and whether a cable extending on the robot will be entangled.

(3) In the conveyance simulation device 100 according to (2) above, the first virtual article feeding unit 130 may have at least one feeding schedule A, B, C according to which the first virtual article feeding unit 130 feeds the virtual articles 71, 72, the feeding schedule A, B, C may include a feeding rate of the virtual article 71, 72, the feeding schedule A, B, C may cause the virtual articles 71, 72 to be fed to the virtual lane 121, 122 at intervals determined based on the feeding rate and the virtual conveying velocity, the feeding schedule A, B, C may include an implementation period during which the feeding schedule is implemented, or a total feeding distance indicating an amount of movement performed by the virtual conveyance unit 120 during implementation of the feeding schedule, and the feeding schedule A, B, C alone may be implemented on each virtual lane 121, 122, or the feeding schedule A, B, C comprises a plurality of feeding schedules A, B, C and a combination of two or more of the plurality of feeding schedules A, B, C may be implemented on each virtual lane 121, 122.

This feature makes it possible to check whether a temporary placing table as a buffer function is needed when a robot takes out the articles, for example.

(4) The conveyance simulation device 100 according to any one of (1) to (3) above may further include an augmented reality display device 200 that displays a predetermined article shape at the positions of the virtual articles 71, 72, the positions being sequentially updated by the virtual article management unit 140.

This feature allows the user of the augmented reality display device 200 to check, in a state in which peripheral devices are absent from the actual worksite, whether the robot 300 or the like will interferes with the peripheral devices, based on the plan of the design stage, and to check whether the performance of the robot 300 is as expected, for example.

(5) In the conveyance simulation device 100 according to (4) above, the operation of the virtual conveyance unit 120, and start and stop of feeding of the virtual articles 71, 72 by the first virtual article feeding unit 130 may be operable by way of the augmented reality display device 200.

This feature allows the user of the augmented reality display device 200 to change, for example, the virtual conveying velocity of the virtual conveyance unit 120 and the feeding schedule of the virtual article feeding unit 130, while monitoring the operation.

(6) In the conveyance simulation device 100 according to (1) above, the first virtual article feeding unit 130 may add information indicating a type of article to the virtual articles 71, 72.

This feature allows the user of the augmented reality display device 200 to visually check the type of the fed virtual articles 71, 72.

(7) A conveyance system 2 according to the present disclosure include: a conveyance unit 500 that conveys articles; a pulse coder 520 that detects an amount of movement of the conveyance unit 500; a second virtual article feeding unit 130a that feeds virtual articles 71, 72 under a predetermined condition; and a virtual article management unit 140a that sequentially updates positions of the virtual articles 71, 72 in accordance with the amount of movement of the conveyance unit 500.

The conveyance system 2 exerts the same effect as that exerted by (1) above.

(8) in the conveyance system 2 according to (7) above, the conveyance unit 500 may have at least one virtual lane 501, 502, the virtual lane 501, 502 may have a virtual article generation position for virtually generating the virtual articles 71, 72, the virtual lane 501, 502 may convey the virtual articles 71, 72 in a same direction as a conveying direction of the conveyance unit 500, and the virtual articles 71, 72 may be generated at a position on the virtual lane 501, 502, the position being randomly offset within a random offset area 511, 512 with reference to the virtual article generation position.

This feature exerts the same effect as that exerted by (2) above.

(9) In the conveyance system 2 according to (8) above, the second virtual article feeding unit 130a may have at least one feeding schedule A1, B1, C1 according to which the second virtual article feeding unit 130a feeds article, the feeding schedule A1, B1, C1 may cause the articles to be fed at predetermined intervals based on the amount of movement of the conveyance unit 500, the feeding schedule A1, B1, C1 may include an implementation period during which the feeding schedule is implemented, or a total feeding distance indicating the amount of movement performed by the conveyance unit 500 during implementation of the feeding schedule, and the feeding schedule A1, B1, C1 alone may be implemented on each virtual lane 501, 502, or the feeding schedule A1, B1, C1 comprises a plurality of feeding schedules A1, B1, C1 and a combination of two or more of the feeding schedules A1, B1, C1 may be implemented on each virtual lane 501, 502.

This feature exerts the same effects as those exerted by (3) above.

(10) The conveyance system 2 according to any one of (7) to (9) above may further include an augmented reality display device 200 that displays a predetermined article shape at the positions of the virtual articles 71, 72, the positions being sequentially updated by the virtual article management unit 140a.

This feature exerts the same effect as that exerted by (4) above.

(11) in the conveyance system 2 according to (10) above, an operation of the conveyance unit 500, and start and stop of feeding of the virtual articles 71, 72 by the second virtual article feeding unit 130a may be operable by way of the augmented reality display device 200.

This feature exerts the same effect as that exerted by (5) above.

(12) in the conveyance system 2 according to (7) above, the second virtual article feeding unit 130a may add information indicating a type of article to the virtual articles 71, 72.

This feature exerts the same effect as that exerted by (6) above.

EXPLANATION OF REFERENCE NUMERALS

1: Conveyance Simulation System
2: Conveyance System
100: Conveyance Simulation Device
120: Virtual Conveyance Unit
130, 130a: Virtual Article Feeding Unit
140, 140a: Virtual Article Management Unit
200: Augmented. Reality Display Device
300: Robot
400: Control Device
500: Conveyance Unit

What is claimed is:

1. A conveyance simulation device comprising:
a virtual conveyance unit that operates virtually;
a virtual article feeding unit that feeds virtual articles to the virtual conveyance unit under a predetermined condition; and
a virtual article management unit that updates positions of the virtual articles in accordance with a virtual movement of the virtual conveyance unit,
wherein the updated positions of the virtual articles are outputted to a control device,
wherein the control device causes a physical robot to perform movement for taking out the virtual articles, based on the updated positions of the virtual articles that the control device has received,
the virtual conveyance unit has a plurality of virtual lanes,
the plurality of virtual lanes having a respective virtual article generation position for virtually generating the virtual articles, and
the virtual articles are generated at respective positions on the plurality of virtual lanes, the respective positions being randomly offset in a direction perpendicular to a direction in which the virtual articles are conveyed, the random offsets being within a predetermined range with reference to the respective virtual article generation positions that are located on a respective centerline of the plurality of virtual lanes.

2. The conveyance simulation device according to claim 1,
wherein the plurality of virtual lanes have at least one virtual conveying velocity, and
wherein the plurality of virtual lanes convey the virtual articles in a same direction as a conveying direction of a conveyance unit to be actually installed.

3. The conveyance simulation device according to claim 2,
wherein the virtual article feeding unit has
at least one feeding schedule according to which the virtual article feeding unit feeds the virtual articles,
wherein the feeding schedule includes a feeding rate of the virtual articles,
wherein the feeding schedule causes the virtual articles to be fed to the plurality of virtual lanes at intervals determined based on the feeding rate and the virtual conveying velocity,
wherein the feeding schedule includes an implementation period during which the feeding schedule is implemented, or a total feeding distance indicating an amount of movement performed by the virtual conveyance unit during implementation of the feeding schedule, and
wherein the feeding schedule alone is implemented on each virtual lane, or the feeding schedule comprises a plurality of feeding schedules and a combination of two or more of the plurality of feeding schedules is implemented on each virtual lane.

4. The conveyance simulation device according to claim 1, further comprising:
an augmented reality display device that displays a predetermined article shape at the positions of the virtual articles, the positions being sequentially updated by the virtual article management unit.

5. The conveyance simulation device according to claim 4, wherein
an operation of the virtual conveyance unit, and start and stop of feeding of the virtual articles by the virtual article feeding unit are operable by way of the augmented reality display device.

6. The conveyance simulation device according to claim 1, wherein
the virtual article feeding unit adds information indicating a type of article to the virtual articles.

7. A conveyance system comprising:
a physical conveyor that is installed in a worksite and conveys articles;
a movement amount detector that is installed in the worksite and detects an amount of movement of the physical conveyor;
a virtual article feeding unit that feeds virtual articles to a plurality of virtual lanes at the physical conveyor, under a predetermined condition; and
a virtual article management unit that updates positions of the virtual articles in accordance with the amount of movement of the physical conveyor,
wherein the updated positions of the virtual articles are outputted to a control device,
wherein the control device causes a physical robot to perform movement for taking out the virtual articles, based on the updated positions of the virtual articles that the control device has received,
the plurality of virtual lanes having a respective virtual article generation position for virtually generating the virtual articles, and
the virtual articles are generated at respective positions on the plurality of virtual lanes, the respective positions being randomly offset in a direction perpendicular to a direction in which the virtual articles are conveyed, the random offsets being within a predetermined range with reference to the respective virtual article generation positions that are located on a respective centerline of the plurality of virtual lanes.

8. The conveyance system according to claim 7,
wherein the plurality of virtual lanes convey the virtual articles in a same direction as a conveying direction of the physical conveyor.

9. The conveyance system according to claim 8,
wherein the virtual article feeding unit has
at least one feeding schedule according to which the virtual article feeding unit feeds articles,
wherein the feeding schedule causes articles to be fed at predetermined intervals based on the amount of movement of the physical conveyor,
wherein the feeding schedule includes an implementation period during which the feeding schedule is implemented, or a total feeding distance indicating the amount of movement performed by the physical conveyor during implementation of the feeding schedule, and
wherein the feeding schedule alone is implemented on each virtual lane, or
the feeding schedule comprises a plurality of feeding schedules and a combination of two or more of the plurality of feeding schedules is implemented on each virtual lane.

10. The conveyance system according to claim 7, further comprising:
an augmented reality display device that displays a predetermined article shape at the positions of the virtual articles, the positions being sequentially updated by the virtual article management unit.

11. The conveyance system according to claim 10, wherein
an operation of the physical conveyor, and start and stop of feeding of the virtual articles by the virtual article feeding unit are operable by way of the augmented reality display device.

12. The conveyance system according to claim 7, wherein
the virtual article feeding unit adds information indicating a type of article to the virtual articles.

* * * * *